United States Patent
Dutta et al.

(10) Patent No.: US 7,555,462 B2
(45) Date of Patent: Jun. 30, 2009

(54) METHOD AND APPARATUS FOR INCORPORATING SCANNED CHECKS INTO FINANCIAL APPLICATIONS

(75) Inventors: Rabindranath Dutta, Austin, TX (US); Dwip N. Banerjee, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1875 days.

(21) Appl. No.: 09/833,347

(22) Filed: Apr. 12, 2001

(65) Prior Publication Data

US 2002/0152166 A1 Oct. 17, 2002

(51) Int. Cl.
*G06Q 40/00* (2006.01)

(52) U.S. Cl. ............... 705/43; 705/39; 705/41; 705/45

(58) Field of Classification Search ............ 705/35–43
See application file for complete search history.

(56) References Cited

U.S. PATENT DOCUMENTS

| | | | |
|---|---|---|---|
| 4,991,205 A | 2/1991 | Lemelson | |
| 5,025,139 A | 6/1991 | Halliburton, Jr. | 235/379 |
| 5,345,549 A | 9/1994 | Appel et al. | 395/154 |
| 5,422,467 A | 6/1995 | Graef et al. | 235/379 |
| 5,444,794 A | 8/1995 | Uhland, Sr. | |
| 5,534,682 A | 7/1996 | Graef et al. | 235/379 |
| 5,540,425 A | 7/1996 | Graef et al. | 271/225 |
| 5,673,333 A | 9/1997 | Johnston | 382/137 |
| 5,677,955 A | 10/1997 | Doggett et al. | 380/24 |
| 5,678,046 A * | 10/1997 | Cahill et al. | 707/202 |
| 5,751,842 A | 5/1998 | Riach et al. | 382/137 |
| 5,752,079 A | 5/1998 | Melen et al. | 395/827 |
| 5,910,988 A | 6/1999 | Ballard | 380/24 |
| 5,918,748 A | 7/1999 | Clark et al. | 209/534 |
| 5,933,478 A * | 8/1999 | Ozaki et al. | 379/93.24 |
| 5,987,439 A | 11/1999 | Gustin et al. | 705/43 |
| 6,012,048 A | 1/2000 | Gustin et al. | 705/39 |
| 6,021,202 A | 2/2000 | Anderson et al. | |
| 6,032,137 A | 2/2000 | Ballard | 705/75 |
| 6,038,553 A * | 3/2000 | Hyde, Jr. | 705/45 |
| 6,064,990 A * | 5/2000 | Goldsmith | 705/75 |
| 6,105,009 A | 8/2000 | Cuervo | |
| 6,164,529 A | 12/2000 | Peters et al. | 235/379 |
| 6,167,381 A | 12/2000 | Swaine et al. | 705/17 |
| 6,189,785 B1 | 2/2001 | Lowery | 235/379 |

(Continued)

OTHER PUBLICATIONS

Souccar, Miriam Kreinin. "Visa Partnership to Develop Wireless Financial Applications." American Banker, vol. 165, Iss. 85, p. 11 May 3, 2000.*

(Continued)

*Primary Examiner*—Hani Kazimi
*Assistant Examiner*—Daniel Kesack
(74) *Attorney, Agent, or Firm*—Yee & Associates, P.C.; Jeffrey S. LaBaw

(57) ABSTRACT

An improved method, apparatus, and computer implemented instructions for processing a check in an automatic teller machine in a data processing system. A check is received from a user at the automatic teller machine. The check is scanned to generate an image. A transaction is performed involving the check. The image is transmitted to a mobile device associated with the user, wherein the image is in a format for use with a financial program.

27 Claims, 9 Drawing Sheets

U.S. PATENT DOCUMENTS

| | | | |
|---|---|---|---|
| 6,438,527 B1 | 8/2002 | Powar | |
| 6,654,797 B1 | 11/2003 | Kamper | |
| 6,661,910 B2 * | 12/2003 | Jones et al. | 382/135 |
| 6,705,517 B1 | 3/2004 | Zajkowski et al. | |
| 6,754,640 B2 | 6/2004 | Bozeman | 705/40 |
| 6,782,402 B1 | 8/2004 | Hidaka et al. | |
| 6,782,419 B2 * | 8/2004 | Tobita et al. | 709/219 |
| 6,786,398 B1 | 9/2004 | Stinson et al. | |
| 6,845,448 B1 | 1/2005 | Chaganti et al. | |
| 7,088,907 B1 | 8/2006 | Nishijima et al. | |
| 2001/0022848 A1 | 9/2001 | Rhoads | |
| 2001/0051920 A1 * | 12/2001 | Joao et al. | 705/41 |
| 2002/0133437 A1 * | 9/2002 | Ansley | 705/35 |
| 2002/0145035 A1 | 10/2002 | Jones | 235/379 |

OTHER PUBLICATIONS

Hoffman, Charles; Christopher Kurt, and Richard J. Koreto. "The XML Files." Journal of Accountancy. May 1999. 187, 5 pp. 71-77.*

Ramster, "End of the Paper Chase", Banking Technology, vol. 14, No. 6, Jul./Aug. 1997, pp. 32-36.

OBrien, "The Changing Face of ATM Networks", Bank Systems & Technology, Jul. 2000, 37, 7; ABI/INFORM Global, p. 38.

Anderson, "Checking In, Checking Out", Columbian, Vancouver, Washington, Mar. 1999, pp. e.1-5.

"AT&T Global's Check Image Feature Expected to Boost Deposits at ATMs", American Banker, V. CLIX, No. 236, Dec. 1994, p. 12.

Medina, "New Applications for Text Recognition", ProQuest, Imaging & Document Solutions, San Francisco Dec. 2000, vol. 9, Issue 12, pp. 1-6.

Kravitz, "SDML—Signed Document Markup Language", W3C Note, Jun. 1998, pp. 1-36, http://www.w3.org/TR/1998/NOTE-SDML-19980619/, retrieved Dec. 21, 2005.

Jeffords et al., "New Technologies to Combat Check Fraud", The CPA Journal, New York, Mar. 1999, vol. 69, Issue 3, pp. 1-7.

* cited by examiner

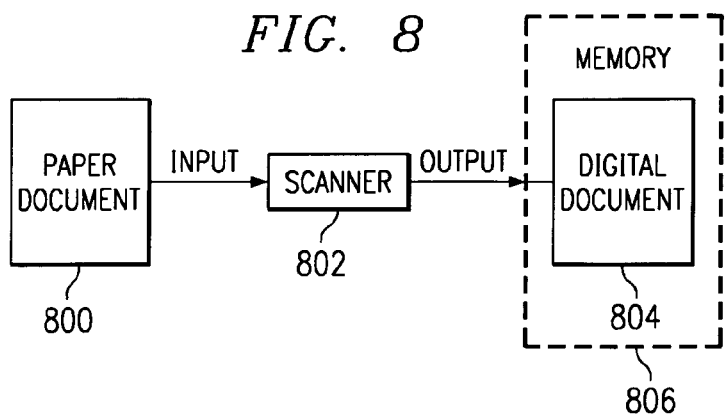
FIG. 8
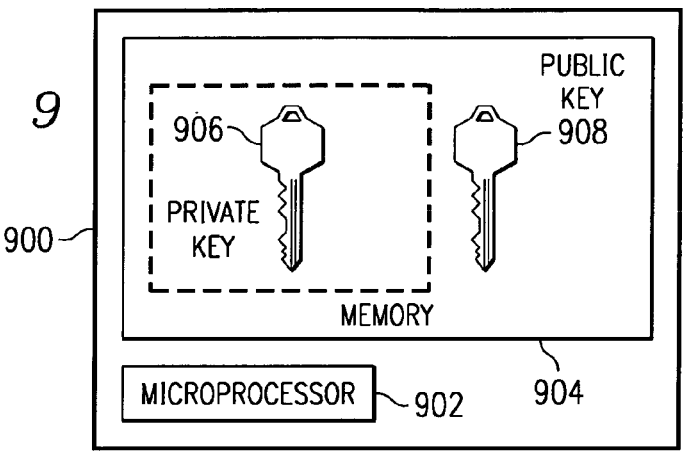
FIG. 9
FIG. 10
```
                              1000
                                \
┌─────────────────────────────────────────────────────────────┐
│                         1002                                │
│  BOB JONES               \         DATE  8/30/98            │
│     PAY TO THE ORDER OF  Payee       1004 ┼ $100.00         │
│     One Hundred and no/100s ─1008                 DOLLARS   │
│                                                             │
│  FIRST NATIONAL BANK                                        │
│  ─────────────────────                                      │
│                                         1010               │
│  MEMO  Invoice #793281 ─1006             /                 │
│  |:00 2100 88\: 990 || 984098||: 2121                      │
└─────────────────────────────────────────────────────────────┘
```

```
!Type: CheckImage                                        1902
D 6/12/00 (date deposited at ATM)                        1904
T 17:36:01 GMT (time check deposited at ATM)             1906
X 539262521 (transaction number at ATM)                  1908
M 53721 (ATM number)                                     1910
B 5367821 (Bank of entity owning ATM)                    1912
F <header data for image> (front of check image)         1914
  <image of front of check>
B <header data for image> (back of check image)          1916
  <image of back of check>
.
.
.<optional other data> (check data)
.
.
^ (end)
```

1900

Note: ( ) areas are comments

```
<fsml-doc docname="echeck187" type="check">
<action>
<blkname>act1
<crit>true
<vers>1.0
<function>payment
<reason>process
</action>
<check>
<blkname>check2
<crit>true
<vers>1.0
<checkdata>
<checksum>187
<dateissued>19970519
<datevalid>19970519
<country>us
<amount>1000000.00
<currency>usd
<payto>Chili Pepper
</checkdata>
<checkbook>2048
<legalnotice>This instrument subject to check law
</check>
<signature>
<blkname>sig7
<crit>true
<vers>1.5
<sigdata>
<blockref>act1
<hash alg="sha">J4t/Nl7s44lqSMTR1/1bkgABwug=
<blockref>check2
<hash alg="sha">vFns/1Vm9QaRDFAgtijkE24cazk=
<blockref>acct-111111111-00000001
<hash alg="sha".f51C8MWtSVgeCQPOmzDTBjy1Zg=
<nonce>9D9BC5AA75
</cert>
<signature>
<blkname>banksig6
```

```
<crit>true
<vers>1.5
<sigdata>
<blockref>acct-111111111-00000001
<hash alg="sha">fF51C8MwtSVgeCQPOmzDTBjy1zg=
<blockref>cert-111111111-00000001
<hash alg="sha">1xzwMBQg7/rXMxC8k79xyotRTVY=
<nonce>9D9BC5AA75
<sigref>cert-111111111
<sigtype>bankacct
<algorithm>sha/dsa
<location>us
</sigdata>
<sig>
Jlnh43b1zYlydAELCmAo6j8nY/
l=:mBnAYXvAB7Pm+EWU865jIQvEr7A=
</signature>
<cert>
<blkname>cert-1111111
<crit>true
<vers>1.0
<certtype>x509v1
<certissuer>/C=US/ST=MD/O=FSTC/OU=checking CA/
<certserial>1
<certdata>
</cert>
</fsml-doc>
```

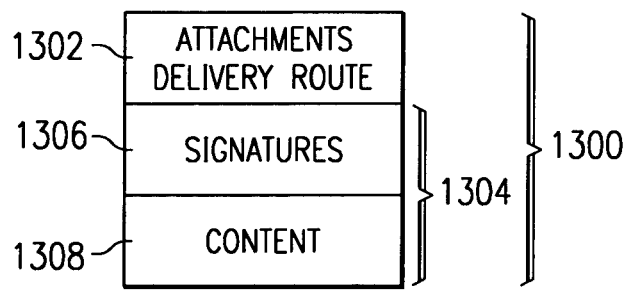

FIG. 13

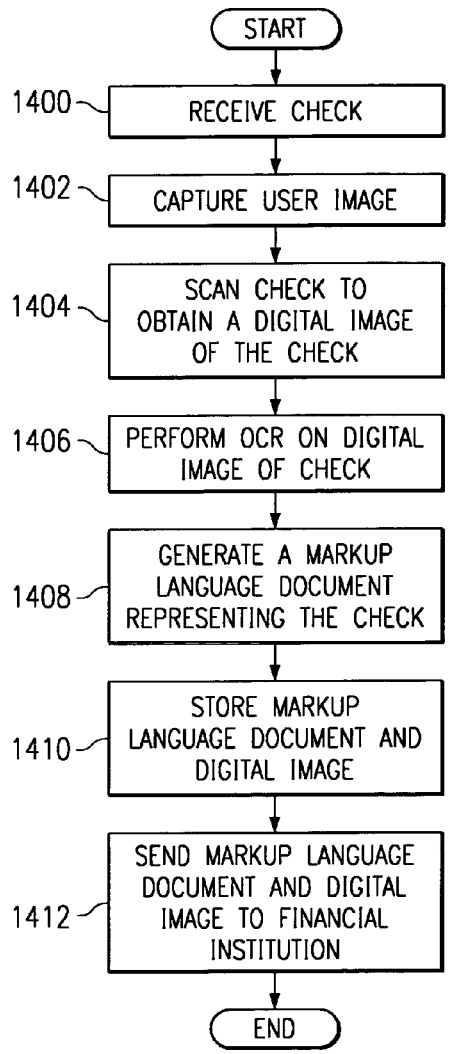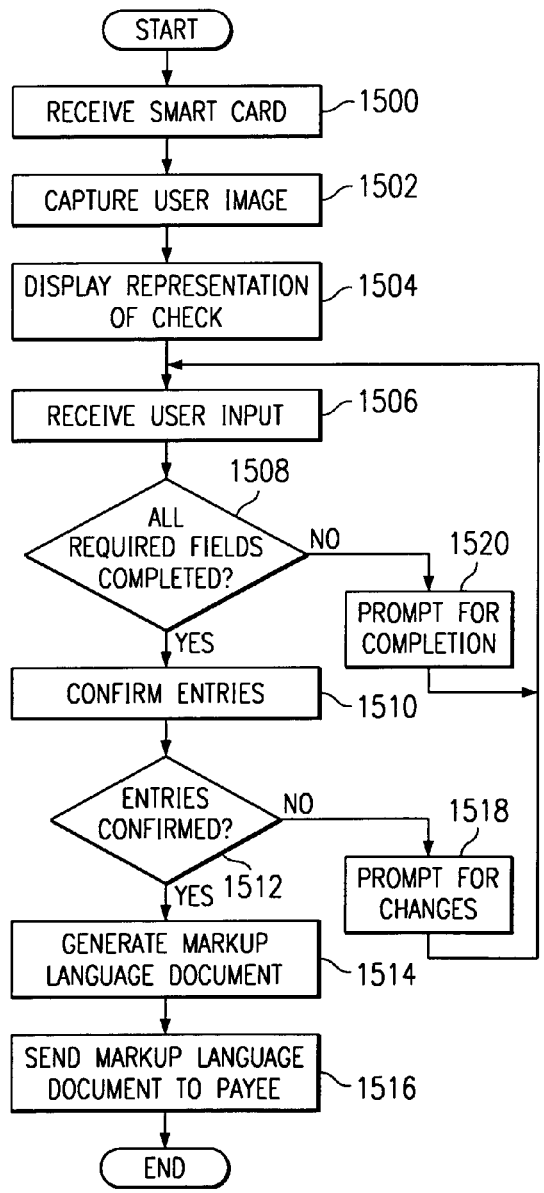

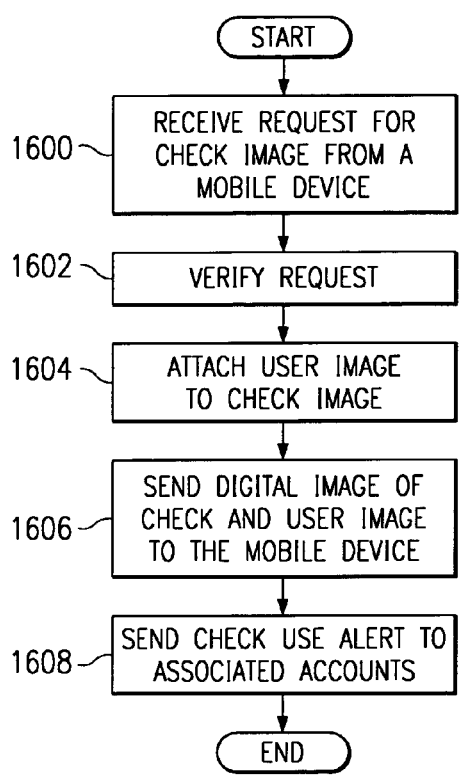

FIG. 16

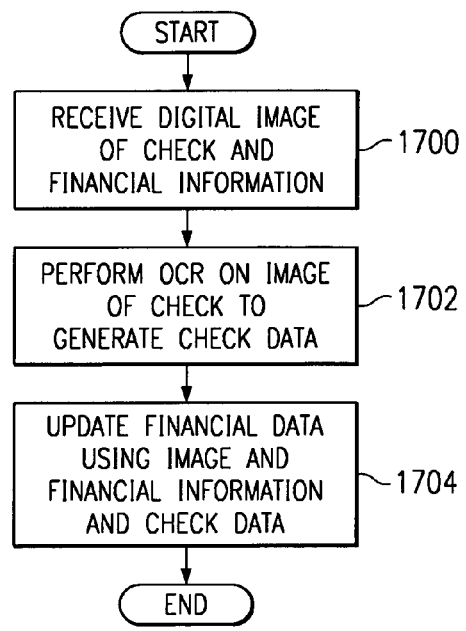

| Header | Type of data | |
|---|---|---|
| !Type:Bank | Bank account transactions | |
| !Type:Cash | Cash account transactions | |
| !Type:CCard | Credit card account transactions | |
| !Type:Invst | Investment account transactions | |
| !Type:Oth A | Asset account transactions | 1804 |
| !Type:Oth L | Liability account transactions | |
| !Account | Account list or which account follows | |
| !Type:Cat | Category list | |
| !Type:Class | Class list | |
| !Type:Memorized | Memorized transaction list | |
| !Type: CheckImage | Check image | 1806 |

1800 · 1802

METHOD AND APPARATUS FOR INCORPORATING SCANNED CHECKS INTO FINANCIAL APPLICATIONS

CROSS REFERENCE TO RELATED APPLICATIONS

The present invention is related to the following applications: Method and Apparatus for Processing Checks at an Automatic Teller Machine for Electronic Transfer, Ser. No. 09/833,344, Method and Apparatus for Processing a Check within a Financial System, Ser. No. 09/833,340, Method and Apparatus for Bill Payments at an Automatic Teller Machine, Ser. No. 09/833,345, and Method and Apparatus for Facilitating Transactions at an Automatic Teller Machine, Ser. No. 09/833,349, filed even date hereof, assigned to the same assignee, and incorporated herein by reference.

BACKGROUND OF THE INVENTION

1. Technical Field

The present invention relates generally to an improved data processing system and in particular to a method and apparatus for processing checks. Still more particularly, the present invention provides a method and apparatus for integrating check information into financial applications.

2. Description of Related Art

Many financial applications and programs are present for users to perform financial planning and management. For example, Quicken 2001 Deluxe is a financial planning program available from Intuit, Inc. Versions of such programs such as Pocket Quicken are available for mobile devices like the Palm handhelds available from Palm, Inc. Quicken 2001 Deluxe and other programs allow for managing finances in areas, such as, for example, banking, investing, taxes, planning, loans, and spending and saving. Many of these programs allow a user to pay bills on-line or to access information from a user's financial institution. A user may even access checks issued by a user along with an identification of which checks have cleared.

These types of capabilities, however, do not reflect checks issued to a user. Presently, a user is required to enter check information into the financial program, deposit the checks, and reconcile deposits from financial statements received from the user's financial information.

Therefore, it would be advantageous to have an improved method and apparatus for providing easier entry of information for checks issued to a user.

SUMMARY OF THE INVENTION

The present invention provides an improved method, apparatus, and computer implemented instructions for processing a check in an automatic teller machine in a data processing system. A check is received from a user at the automatic teller machine. The check is scanned to generate an image. A transaction is performed involving the check. The image is transmitted to a client device associated with the user, wherein the image is in a format for use with a financial program. Additionally, checks issued by a user at an automatic teller machine (ATM) may be stored as an image and transmitted to the mobile device.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8 is a diagram illustrating data flow in creating a check image in accordance with a preferred embodiment of the present invention;

FIG. 9 is a diagram of a smart card, which may be used to create an electronic check, in accordance with a preferred embodiment of the present invention;

FIG. 10 is a diagram of a check presented on a display for completion in accordance with a preferred embodiment of the present invention;

FIGS. 12A-12B are diagrams of an electronic check in accordance with a preferred embodiment of the present invention;

FIG. 13 is an illustration of a message sent from an ATM to a financial institution in accordance with a preferred embodiment of the present invention;

FIG. 14 is a flowchart of a process used for creating an electronic check in an ATM in accordance with a preferred embodiment of the present invention;

FIG. 15 is a flowchart of a process used for creating an electronic check in accordance with a preferred embodiment of the present invention;

FIG. 16 is a flowchart of a process used for processing a check deposited at an ATM in accordance with a preferred embodiment of the present invention;

FIG. 17 is a flowchart of a process used for processing check information in accordance with a preferred embodiment of the present invention;

FIG. 18 is a diagram illustrating header and data information used for translating data into a Quicken interchange format (QIF) in accordance with a preferred embodiment of the present invention.

DETAILED DESCRIPTION OF THE PREFERRED EMBODIMENT

Figure 1:
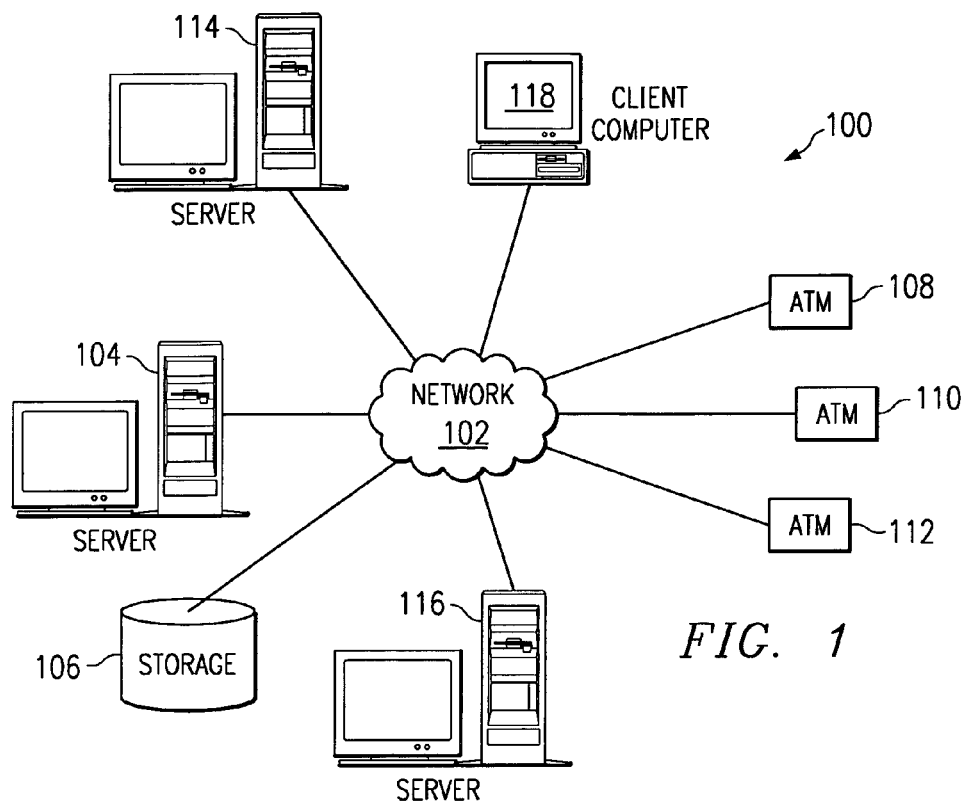
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. Server 104 is a computer located at a financial institution, such as a bank, a credit union, a mortgage company, or a brokerage firm.

Server 104 is used to provide various functions relating to daily financial transactions handled by the bank, such as deposits and withdrawals of funds. In addition, ATMs 108, 110, and 112 also are connected to network 102. ATMs 108, 110, and 112 are clients to server 104. Server 104 is in communication with ATMs 108, 110, and 112 to handle various transactions that users may initiate at these devices. For example, if a user withdraws cash from ATM 108, the debiting of the account is handled by server 104.

Server 114 and server 116 also are connected to network 102 and may represent computers located at other financial institutions. ATMs 108, 110, and 112 also may be clients to these servers depending on the particular user accessing ATMs 108, 110 and 112. Additionally, these servers may also represent computers located at other financial institutions, such as a regional clearing house, a national clearing house, or a Federal Reserve Bank.

The present invention provides for scanning of checks at an ATM, such as ATM 108, when a user deposits a check with the financial institution. An image of both sides of the check is made when the check is deposited. Additionally, optical character recognition (OCR) is performed on the check to obtain information such as the recipient of the check and the amount of funds to be transferred from the account. Further, a magnetic ink reader reads magnetic ink data on the check to obtain information, such as the bank's identification number, as well as the user's checking account number with the bank. A markup language document is created containing this other information obtained from the check. The markup language document forms an electronic check. Additionally, the image of the check also may be associated with the markup language document as part of the electronic check. This electronic check is then sent from ATM 108 to server 104 for processing.

The image of a check or the electronic check may be processed and stored so that a user can access this information, such as from a secure Web site. Further, this information may be put into a format for downloading to a user from this site in which the information may be easily imported into a financial program. For example, Quicken 2001 Deluxe, which is available from Inuit, Inc., allows for downloading of financial files in a Quicken interchange format (QIF). The present invention may associate images files with this type of format file so that images of checks may be displayed or downloaded by a user for use within the financial program. In this manner, a user may easily download images of checks and associated financial data in a tightly integrated fashion. This information may include both checks issued by the user and deposited by the user.

Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. Of course, network data processing system 100 also may be implemented as a number of different types of networks, such as, for example, an intranet, a local area network (LAN), or a wide area network (WAN). FIG. 1 is intended as an example, and not as an architectural limitation, for the present invention.

Figure 2:
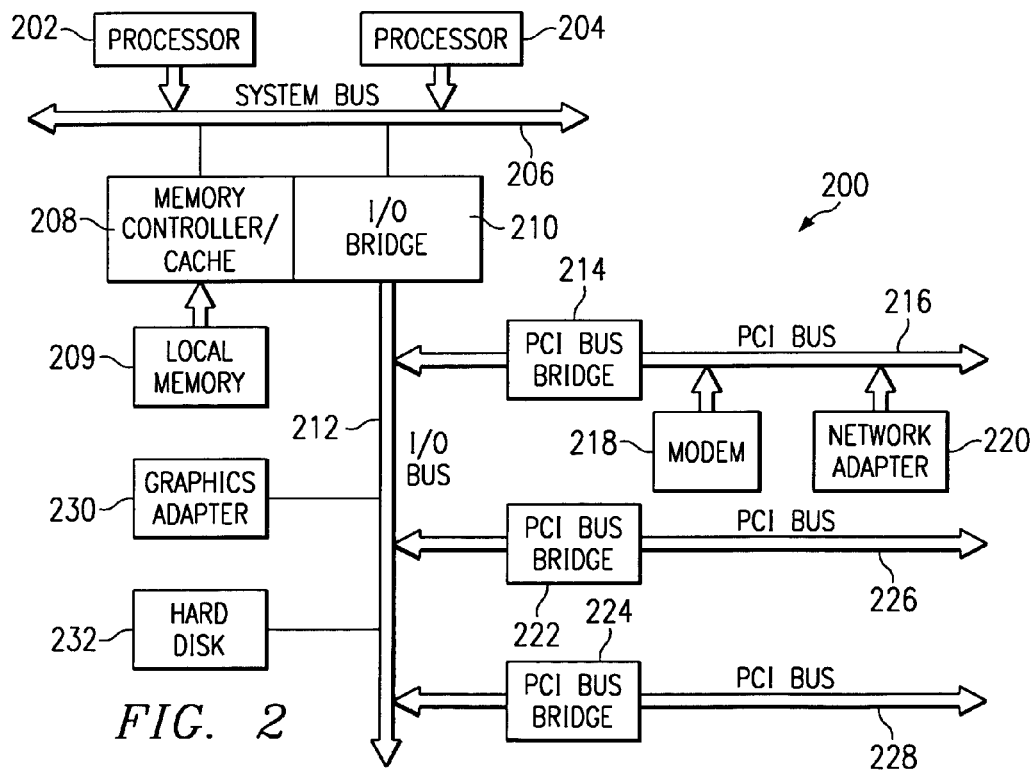
FIG. 2 is a block diagram of a data processing system that may be implemented as a server in accordance with a preferred embodiment of the present invention.

Referring to FIG. 2, a block diagram of a data processing system that may be implemented as a server, such as server 104, 114, or 116 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to ATMs 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
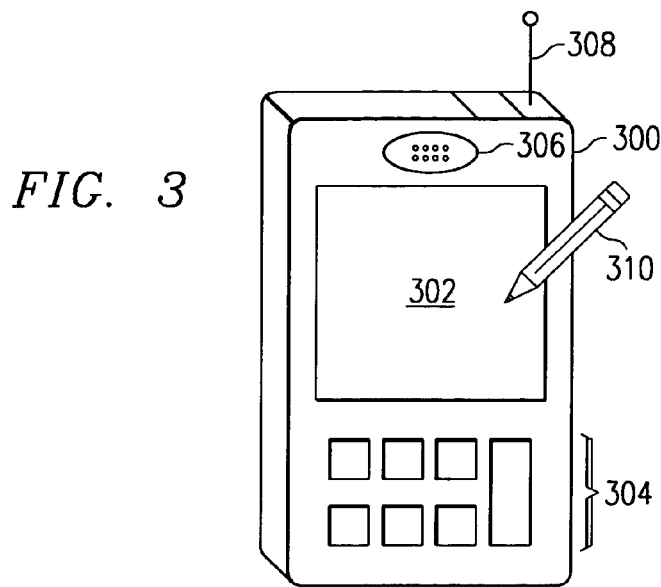
FIG. 3 is a diagram of a client in the form of a personal digital assistant (PDA) in accordance with a preferred embodiment of the present invention.

With reference now to FIG. 3, a diagram of a client in the form of a personal digital assistant (PDA) is depicted in accordance with a preferred embodiment of the present invention. PDA 300 may be employed by a user to receive financial information and images of checks directly from an ATM at which the user deposits a check.

PDA 300 includes a display 302 for presenting textual and graphical information. Display 302 may be a known display device, such as a liquid crystal display (LCD) device. The display may be used to present a map or directions, calendar information, a telephone directory, or an electronic mail message. In these examples, display 302 may receive user input using an input device such as, for example, stylus 310.

PDA 300 may also include keypad 304, speaker 306, and antenna 308. Keypad 304 may be used to receive user input in addition to using screen 302. Speaker 306 provides a mechanism for audio output, such as presentation of an audio file. Antenna 308 provides a mechanism used in establishing a wireless communications link between PDA 300 and a network, such as network 102 in FIG. 1.

PDA 300 also preferably includes a graphical user interface that may be implemented by means of systems software residing in computer readable media in operation within PDA 300.

Figure 4:
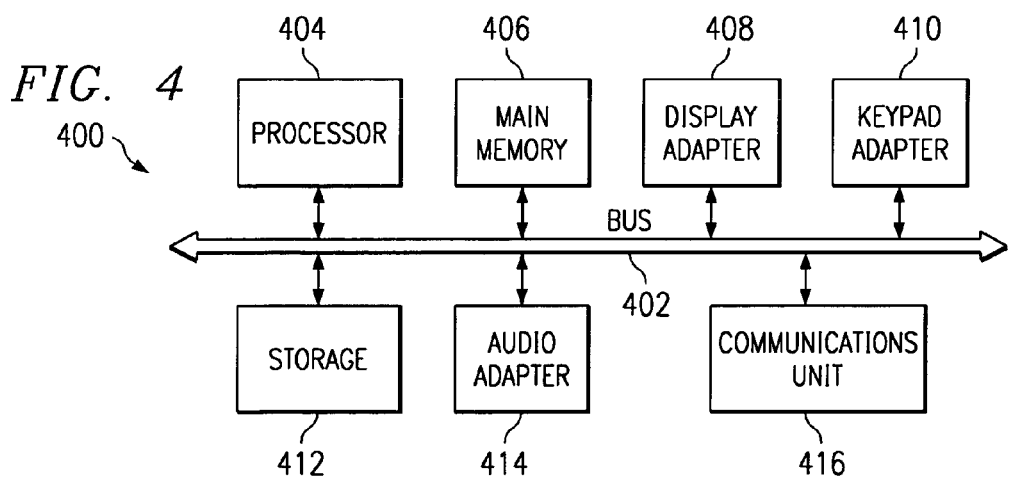
FIG. 4 is a block diagram of a PDA in accordance with a preferred embodiment of the present invention.

Turning now to FIG. 4, a block diagram of a PDA is shown in accordance with a preferred embodiment of the present invention. PDA 400 is an example of a PDA, such as PDA 300 in FIG. 3, in which code or instructions implementing the processes of the present invention may be located. PDA 400 includes a bus 402 to which processor 404 and main memory 406 are connected. Display adapter 408, keypad adapter 410, storage 412, and audio adapter 414 also are connected to bus 402. Communications unit 416 provides a mechanism to allow communication between PDA 400 and another device, such as an ATM. Any wireless communications system may be employed within communications unit 416 in these examples. Bluetooth is an example of a wireless technology that may be used in communications unit 416. Bluetooth is a de facto standard, as well as a specification for small-form factor, low-cost, short range radio links between mobile PCs, mobile phones, and other portable devices. Further, display adapter 408 also includes a mechanism to receive user input from a stylus when a touch screen display is employed.

An operating system runs on processor 404 and is used to coordinate and provide control of various components within PDA 400 in FIG. 4. The operating system may be, for example, a commercially available operating system such as Windows CE, which is available from Microsoft Corporation. Instructions for the operating system and applications or programs are located on storage devices, such as storage 412, and may be loaded into main memory 406 for execution by processor 404.

Those of ordinary skill in the art will appreciate that the hardware in FIG. 4 may vary depending on the implementation. Other internal hardware or peripheral devices, such as flash ROM (or equivalent nonvolatile memory) or optical disk drives and the like, may be used in addition to or in place of the hardware depicted in FIG. 4.

Figure 5:
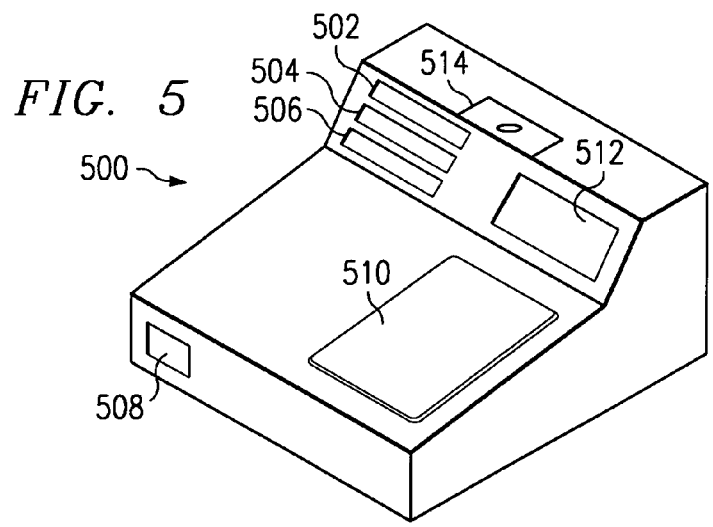
FIG. 5 is a diagram illustrating an automatic teller machine (ATM) in accordance with a preferred embodiment of the present invention.

Turning next to FIG. 5, a diagram illustrating an automatic teller machine (ATM) is depicted in accordance with a preferred embodiment of the present invention. ATM 500 is an illustration of an ATM, such as ATM 108, 110, or 112 in FIG. 1.

In this example, an ATM card or a smart card may be received in slot 502. ATM 500 also includes an input slot 504 and an output slot 506. Input slot 504 is used to receive items, such as cash or a check for deposit. Cash dispenser slot 508 is used to dispense cash to a user. Keypad 510 provides an input device for a user to input information, such as an amount of money that is to be deposited, or to make selections, such as receiving an account balance or an amount of cash to withdraw. Display 512 is used to present information to the user. Video camera 514 provides for recording transactions.

Figure 6:
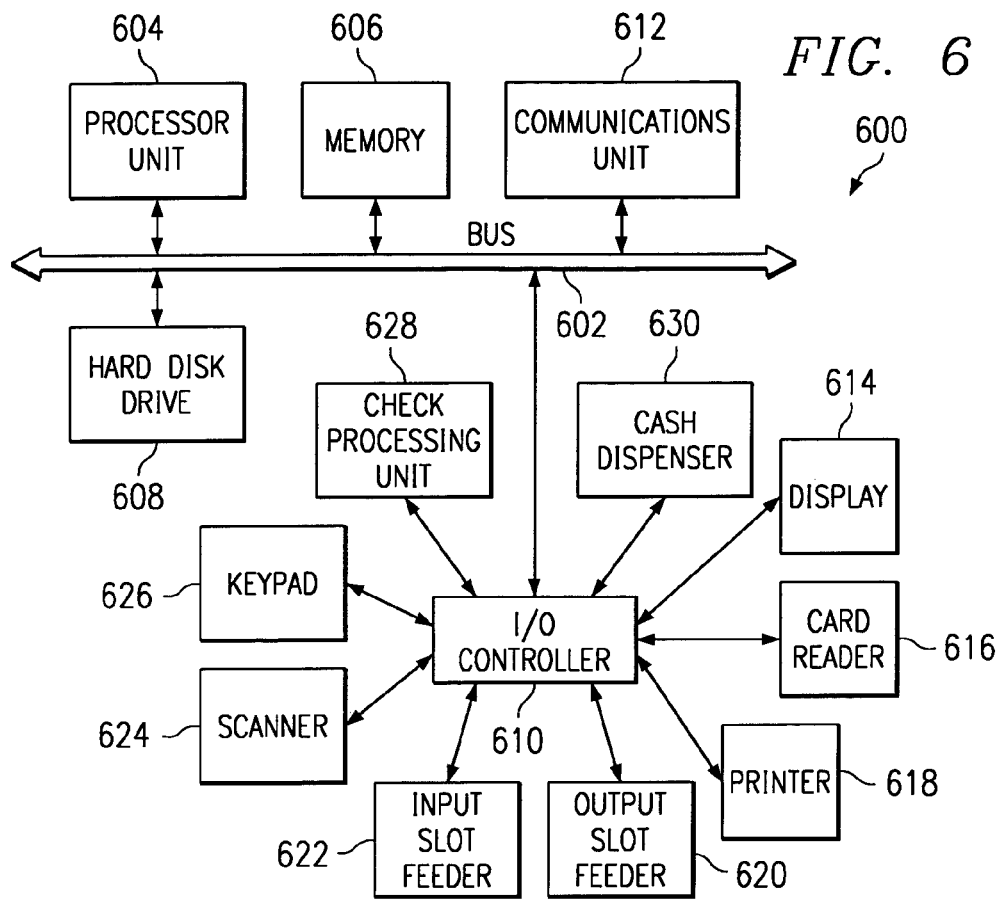
FIG. 6 is a block diagram illustrating an ATM in accordance with a preferred embodiment of the present invention.

Turning next to FIG. 6, a block diagram illustrating an ATM is depicted in accordance with a preferred embodiment of the present invention. ATM 600 may be implemented as in ATM 108, 110, or 112 in FIG. 1.

In the depicted examples, bus 602 connects processor unit 604, memory 606, hard disk drive 608, I/O controller 610, and communications unit 612. Computer instructions may be located in memory 606 or in hard disk drive 608. These instructions are processed by processor unit 604 to provide ATM functions as well as the check scanning and electronic check creation processes of the present invention. Additionally, transaction information may also be stored on hard disk drive 608. Communications unit 612 provides for establishing a communications link with a server, such as server 104, 114, or 116 in FIG. 1 through a network, such as network 102 in FIG. 1. In this example, communications unit 612 may take the form of an Ethernet adapter to provide for communications with various financial institutions. Further, communications unit 612 may also include a wireless communications module, such as a Bluetooth based wireless communications unit, to allow for communications with devices, such as PDA 400 in FIG. 4.

I/O controller 610 provides a mechanism for input/output devices, such as, for example, display 614, card reader 616, printer 618, output slot feeder 620, input slot feeder 622, scanner 624, keypad 626, check processing unit 628, and cash dispenser 630. Display 614 provides a mechanism to present information to the ATM user. Card reader 616 is used to read an ATM card or a smart card inserted into the ATM. Printer 618 is used to print a receipt or other information in response to a user input. Keypad 626 is used to receive user input. Output slot feeder 620 is used to feed receipts generated by printer 618 to an output slot, such as output slot 506 in FIG. 5. Input slot reader 622 is used to receive checks or cash placed into an input slot, such as input slot 504 in FIG. 5. Check processing unit 628 is used to move a check within the ATM. In particular, check processing unit 628 may move a check into a position for scanning by scanner 624 and then move the check into storage. If a check in not accepted, the check may be returned to output slot 620 for return to a user. Cash dispenser 630 is used to dispense cash when a user withdraws funds from a user account.

The components depicted in FIGS. 3-6 are provided for purposes of illustration and are not meant to imply architectural limitations to the present invention.

Figure 7:
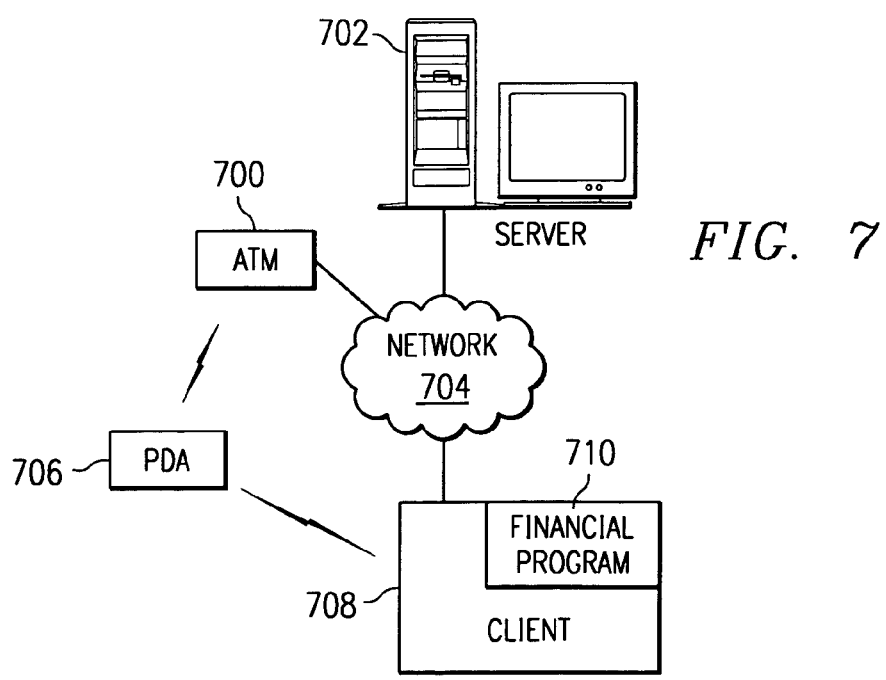
FIG. 7 is a diagram illustrating transfer of information for import into a financial application in accordance with a preferred embodiment of the present invention.

With reference now to FIG. 7, a diagram illustrating transfer of information for import into a financial application is depicted in accordance with a preferred embodiment of the present invention. A user may deposit a check at ATM 700 to credit the user's account with a financial institution. In these examples, the check is scanned within ATM 700 to create an image of the check. This check and information obtained from the check may be sent to server 702 located at the financial institution through network 704. Information regarding the deposit of the check may be returned to ATM 700 from server 702. This information, as well as an image of the check, may be downloaded to the user through a mobile device, such as PDA 706. PDA 706 is shown for purposes of illustration, and other mobile devices, such as a mobile phone, also may be used. In the depicted examples, the information is placed into a format that may be imported by various financial programs. The user may then upload the information to client 708 for import to financial program 710. In this manner, check images and other financial information may be easily integrated into financial programs or applications. Financial programs also could be located in PDA 706 depending on the implementation.

Additionally, the check image and other financial information may be sent or made available to a user through a Web site or by sending of an e-mail. For example, the check image and information may be placed into a file in a format for import to a financial program on a secure Web site. The user accesses the Web site through client 708 by entering an appropriate ID and password. The user may then download the file for import and use in the financial program. The transfer takes place using a secure connection, such as that provided by the Secure Sockets Layer (SSL) protocol. Alternatively, the information may be sent in an e-mail or as an attachment to an e-mail in an encrypted form.

The issuing of a check at ATM 700 may be initiated through a smart card or some other verification device. The check may be issued as a physical check to the user with an image of this check being sent to PDA 706 or client 708 as a receipt. Alternatively, the check may be sent electronically to a third party and printed at the third party premises.

Turning next to FIG. 8, a diagram illustrating data flow in creating a check image is depicted in accordance with a preferred embodiment of the present invention. Paper document 800 is input or placed into an ATM, such as ATM 500, through input slot 504 in FIG. 5. In this example, paper document 800 is a check. Scanner 802 scans both sides of paper document 800. In this manner, endorsements as well as signature and amount information from the front of the check may be obtained. Digital document 804 is generated by scanner 802 and stored in memory 806 for further processing. Optical character recognition (OCR) processes may be initiated to process digital document 804 to generate information used in creating a markup language representation of paper document 800. In these examples, this markup language representation forms an electronic check.

With reference now to FIG. 9, a diagram of a smart card, which may be used to create an electronic check, is depicted in accordance with a preferred embodiment of the present invention. Smart card 900 is a credit card with microprocessor 902 and memory 904 and is used for identification or financial transactions. When inserted into a reader through slot 502 in ATM 500 in FIG. 5, smart card 900 transfers data to and from ATM 500. In these examples, smart card 900 contains private key 906 and public key 908 within memory 904. Smart card 900 is more secure than a magnetic stripe card and can be programmed to self-destruct if the wrong password is entered too many times. As a financial transaction card, smart card 900 can be loaded with digital money and used like a traveler's check, except that variable amounts of money can be spent until the balance is zero. These keys are used for digital signing of checks in these examples.

More precisely, the private key is used in the process of applying a digital signature to an electronic check or to an electronic document. Applying a digital signature by using hashing operations and a private key is well known to those of ordinary skill in the art. However, for other activities the public key of an individual is also typically stored in a smart card, and this is how smart card 900 has been depicted. Note that smart card 900 is depicted for the purposes of the preferred embodiment of the present invention. Other cards, such as credit cards, may also be used. Popular usage does not normally refer to credit cards as smart cards. However, technically speaking, even credit cards are a type of smart card and are governed by internationally accepted appropriate smart card standards. Hence, the preferred embodiment of the present invention is illustrated through a generic smart card in preference to a conventional credit card or an ATM card.

Turning now to FIG. 10, a diagram of a check presented on a display for completion is depicted in accordance with a preferred embodiment of the present invention. Check 1000 is an example of a check, which may be presented to a user on a display, such as display 512 in ATM 500 in FIG. 5. Check 1000 is presented to the user after verification of the user's authority to generate a check. In the depicted examples, the verification is made by an insertion of a smart card into an ATM, such as ATM 500 in FIG. 5, along with entry of a correct password or PIN. The user may enter information into payee field 1002, amount field 1004, and memo field 1006. Entry of an amount in amount field 1004 results in amount field 1008 being auto filled for the user. In this example, payee field 1002 and amount field 1004 are required fields that must be filled in for check 1000 to be complete. Memo field 1006 is an optional field, which may be left blank. In the depicted examples, a digital signature is used to complete the check and may be provided through the smart card. Depending on the implementation, the user may actually sign field 1010 using a stylus if the display includes a touch screen to accept such data.

When the user affirms that the check is complete and should be sent, the check may then be routed to the payee or to some other party in the form of an electronic check. The electronic check is in the form of a markup language document as described above. More specifically, financial services markup language (FSML) is an example of a markup language which may be used to generate electronic checks.

Figures 11, 19:
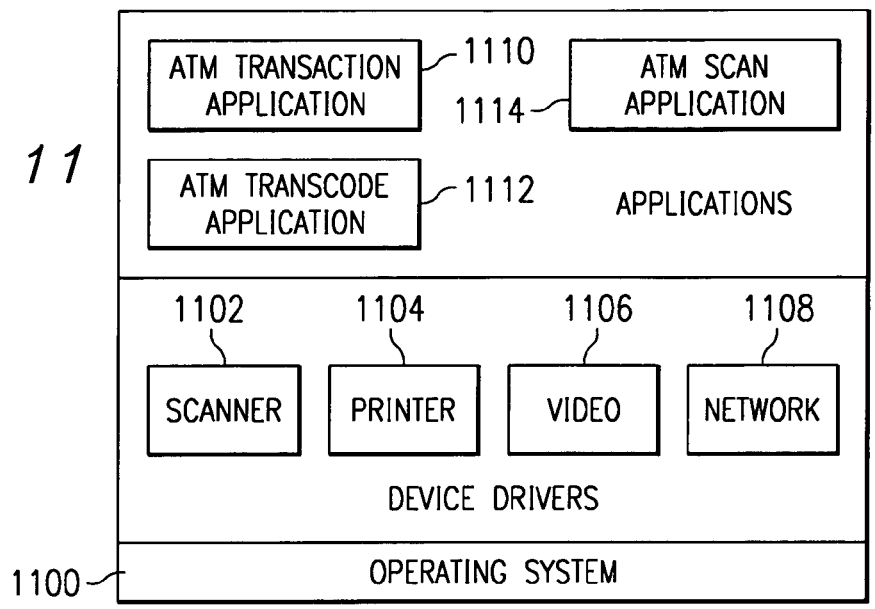
FIG. 11 is a diagram illustrating software components in an ATM in accordance with a preferred embodiment of the present invention.
FIG. 19, is a sample QIF file, which may be processed by the present invention.

Turning next to FIG. 11, a diagram illustrating software components in an ATM is depicted in accordance with a preferred embodiment of the present invention. In this example, the software components in an ATM include operating system 1100, scanner device driver 1102, printer device driver 1104, video device driver 1106, network device driver 1108, ATM transaction application 1110, ATM transcode application 1112, and ATM scan application 1114.

The device drivers provide the components needed to operate devices within an ATM. These device drivers are used by ATM transaction application 1110, ATM transcode application 1112, and ATM scan application 1114 to perform various input/output functions.

ATM transaction application 1110 provides processes for various transactions by a user. Cash withdrawals, balance inquiries, fund transfers, and deposits are examples of transactions that may be handled through ATM transaction application 1110. Additionally, ATM transaction application 1110 handles the transmission and receipt of information to and from various financial institutions. When a check is deposited, ATM scan application 1114 is initiated to create an image of the check. In the depicted examples, the image is of both sides of the check. Additionally, ATM scan application 1114 will also include optical character recognition processes to obtain data for use in creating an electronic check. This data is used by ATM transcode application 1112 to generate a markup language representation of the check.

ATM transaction application 1110 also may transfer the image of a check and other information to a user mobile device, such as a PDA or mobile phone. The user may then upload that information to a computer containing a financial program. The image and information are placed into a format that allows for its import into the financial program.

In these examples, the markup language may be financial services markup language (FSML) and sign digital markup language (SDML). FSML is used to implement electronic checks and other secure financial documents. FSML defines a method to structure documents into blocks of tagged content. Unlike HTML, which uses tags to inform processors about how to display content, FSML uses tags to inform processors about how to use the document content in financial applications. The FSML content blocks in an FSML document can be cryptographically sealed and signed in any combination needed by business applications. Document processors may also remove blocks without invalidating the signatures on the remaining blocks. They may combine signed documents and then sign blocks contained in the combined documents. Signatures are themselves structured as FSML blocks, as are the X.509 certificates needed by downstream processors to verify the signatures. Thus, signatures and certificates become part of the FSML document so that they can be verified and countersigned by later signers.

SDML is designed to tag the individual text items making up a document, to group the text items into document parts which can have business meaning and can be signed individually or together, to allow document parts to be added and deleted without invalidating previous signatures, and to allow signing, co-signing, endorsing, co-endorsing, and witnessing operations on documents and document parts. The signatures become part of the SDML document and can be verified by subsequent recipients as the document travels through the business process. SDML does not define encryption, since encryption is between each sender and receiver in the business process and can differ for each link depending on the transport used. SDML is the generic document structuring and signing part of the FSML.

In the depicted examples, the markup language document forms an electronic check. Depending on the implementation, the electronic check also may include the image of the check.

Referring now to FIGS. 12A-12B, diagrams of an electronic check are depicted in accordance with a preferred embodiment of the present invention. Electronic check 1200 is in the form of a financial services markup language (FSML) document. This example illustrates some fields that may be found within an electronic check. In this example, electronic check 1200 does not illustrate the actual certificate of data used in the document. Electronic check 1200 is an example of an electronic check which may be created by transcode application 1112 in FIG. 11 in response to scanning a check or creating a check, such as check 1000 in FIG. 10.

In the depicted examples, the markup language document forms an electronic check, such as an electronic representation of a physical check. Depending on the implementation, the electronic check also may include the image of the check.

Turning next to FIG. 13, an illustration of a message sent from an ATM to a financial institution is depicted in accordance with a preferred embodiment of the present invention. Message 1300 is an example of a message that may be sent from an ATM to a financial institution. For example, an electronic check is generated at an ATM, such as ATM 108 in server 104 in FIG. 1, for processing. The electronic check may be sent within message 1300.

Message 1300 includes header 1302 and body 1304. Header 1302 may include information, such as an identification of attachments and a delivery route for the message. Body 1304 may include signatures 1306 as well as content 1308. Signature 1306 may be obtained from scanning of the check or via a digital signature from a smart card held by the user. Content 1308 may contain the digital image of the check and/or an electronic check. The electronic check may be a document created using FSML and SDML.

Turning next to FIG. 14, a flowchart of a process used for creating an electronic check in an ATM is depicted in accordance with a preferred embodiment of the present invention. The process illustrated in FIG. 14 may be implemented within ATM scan application 1114 and ATM transcode application 1112 in FIG. 11.

The process begins by receiving a check (step 1400). Next, a user image is captured (step 1402). This image may be used for verification and identification purposes. Then, the check is scanned to obtain a digital image of the check (step 1404). In these examples, both sides of the check are scanned. Additionally, this scanning step also may include reading magnetic ink data on the check, which may contain a bank identification number and a checking account number. Optical character recognition (OCR) is performed on the digital image of the check to generate data for use in creating an electronic check (step 1406).

Then, a markup language document is generated representing the check (step 1408). This markup language document forms an electronic check in this example. The markup language document and digital image are stored (step 1410). Thereafter, the markup language document and the digital image are sent to the financial institution (step 1412) with the process terminating thereafter. The markup language document and digital image are sent to the financial institution through a communications link, such as one provided by network 102 in FIG. 1.

In this manner, the check deposited by the ATM user can be processed without requiring further physical handling to transfer funds to the ATM user's account. Thus, the process used for transferring funds between accounts may be streamlined through the creation of electronic checks from physical checks at an ATM.

Turning next to FIG. 15, a flowchart of a process used for creating an electronic check is depicted in accordance with a preferred embodiment of the present invention. The process illustrated in FIG. 15 may be implemented as a set of computer instructions for use in applications, such as ATM transaction application 1110 and ATM transcode application 1112 in FIG. 11.

The process begins by receiving a smart card, such as smart card 900 in FIG. 9, from a user (step 1500). The user image is then captured (step 1502). Next, a representation of a check, such as check 1000 in FIG. 10, is displayed (step 1504). The user is the pay or in this example. User input is then received (step 1506). This user input includes entry of information into fields, such as an amount for the check, a payee, and a memo. A determination is then made as to whether all required fields are completed (step 1508).

If all required fields are completed, the entries are confirmed (step 1510). This confirmation allows the user one last chance to make changes or to cancel the check before the transaction is initiated. Next, a determination is made as to whether the entries are confirmed (step 1512). If confirmed, a markup language document is generated (step 1514). This document forms the electronic check. The markup language document is then sent to the payee, to the payee's financial institution, or to some third party authorized to receive checks for the payee (step 1516) with the process terminating thereafter.

With reference again to step 1512, if the entries are not confirmed, the user is prompted for changes (step 1518) and the process returns to step 1506 as described above. Turning back to step 1508, if all required fields are not completed, then the user is prompted for completion (step 1520) and the process returns to step 1506.

Referring to FIG. 16, a flowchart of a process used for processing a check deposited at an ATM is depicted in accordance with a preferred embodiment of the present invention. The process illustrated in FIG. 16 may be implemented in an ATM, such as ATM 600 in FIG. 6. The processes illustrated in FIG. 16 may be applied to checks deposited by a user as well as to checks issued to the user.

The process begins by receiving a request for a check image from a mobile device (step 1600). The request is verified (step 1602). This verification step is employed to ensure that the mobile device is authorized to receive the image. This verification may be made through various mechanisms. For example, a certificate system may be employed to verify the request. The user image is attached to the check image (step 1604). Other biometric data may be used to verify the customer making the request. For example, fingerprints or retinal scans may be employed. The user image may be obtained by a video camera at the ATM. This user image may be used to identify the user issuing a check or depositing a check in the case of multi-user accounts. Next, the digital image of the check and user image are sent to the mobile device, along with other data regarding the check, in some markup language format such as FSML (step 1606). This information may be compressed to save storage space within the mobile device.

This information is now available for further use, such as for importing the information into a financial program.

A check use alert is then sent to all associated accounts (step 1608) with the process terminating thereafter. This alert allows all users of an account to be aware of when a check is issued or deposited. The alert may, for example, include the check image as well as any debit or credit information. In this manner, all users of an account will be able to quickly identify the current amount of funds present within the account.

With reference now to FIG. 17, a flowchart of a process used for processing check information is depicted in accordance with a preferred embodiment of the present invention. The process illustrated in FIG. 17 may be implemented in a financial program located on a device such as PDA 400 in FIG. 4 or client 118 in FIG. 1.

The process begins by receiving an image of a check and financial information (step 1700). This information is received in a file that is formatted for import by the financial program. The image is that of a check deposited or issued by the user. The financial information may include, for example, a verification of the credit or debit and current funds in the account. Other financial information may include an image of the user identification of the user involved in the transaction. This image may be used to track usage patterns for different users of a multi-user account.

If information is received in a markup language or other format, this information may be mapped from the markup language to the format used by the financial program through various well-known mapping processes. For example, fields in FSML identifying an amount, a payee, a payor, and a date may be identified and placed into a form for use by a financial program, such as Quicken 2001 Deluxe. These processes typically identify the desired fields in the source data structure and translate this data into a target data structure in which the target data structure is recognized by the financial program.

Next, OCR processes may be performed on the image of the check to generate check data if such information has not been supplied by the bank concerned, such as in step 1606 in FIG. 16 (step 1702). The financial data within the financial program is updated using the image, financial information, and check data (step 1704) and the process terminates thereafter. This updating may include an analysis of spending and using habits, which may include usage patterns for different users for a multi-user account.

Turning next to FIG. 18, a diagram illustrating header and data information used for translating data into a Quicken interchange format (QIF) is depicted in accordance with a preferred embodiment of the present invention. This format is used with text in an ASCII file to allow transactions to be moved from one account register to another account register, or to or from other programs that support this format. Column 1800 identifies the header that is found at the beginning of each file. Column 1802 identifies the types of data that will be found within the file containing this header. The entries in section 1804 illustrate types of data currently used in QIF files. The entry in section 1806 depicts a new type of data, a check image, which may be used in a QIF file. The types of data illustrated in FIG. 18 are illustrative of some of the types of data that may be transferred using QIF files.

Turning next to FIG. 19, a sample QIF file, which may be processed by the present invention, is illustrated. In this example, QIF file 1900 includes header line 1902. This header line identifies QIF 1900 as a file containing a check image and other information regarding the check. For example, line 1904 identifies the date the check was deposited at an ATM, while line 1906 identifies the time of the deposit. Line 1908 provides a transaction number, line 1910 provides an ATM number, and line 1912 identifies a bank owing the ATM. Line 1914 provides header data for an image of the front of the check, while line 1916 provides header data for the image of the back of the check. Of course, other check data may be contained within QIF file 1900, depending on the particular implementation.

According to the present invention, a new type of header to identify a data type as being a check image may be implemented to allow for importing of check images into financial programs. By including fields that correspond to storing check images, a QIF file containing this information may be used to import check images into a financial program.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, the smart card may be replaced by a regular credit card or ATM card with some loss in functionality. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for processing a check, the method comprising:

receiving, from a user, a check at an automatic teller machine;

scanning the check to generate an image;

transmitting the image to a financial institution data processing system;

performing a transaction involving the check at the financial institution data processing system to generate a transaction result;

transmitting the transaction result to the automatic teller machine; and transmitting, by the automatic teller machine, the image and the transaction result to a mobile device associated with the user.

2. The method of claim 1 further comprising:

importing the image and the transaction result into an end-user financial program that is useable to manage finances for the user such that both (i) a current account balance for the user, which accounts for an amount indicated by the received check, and (ii) the image of the received check are accessible to the user using the end-user financial program.

3. The method of claim 2, wherein the financial program is located on the mobile device.

4. The method of claim 2, wherein the financial program is located on another data processing system other than the mobile device.

5. The method of claim 4, further comprising a step of transmitting the image and the financial information from the mobile device to the another data processing system.

6. The method of claim 1 further comprising:
sending an alert for the transaction to a plurality of users associated with an account, the account being updated based upon the transaction result.

7. The method of claim 6, wherein the alert includes an identification of the transaction.

8. The method of claim 1 further comprising:
capturing an image of the user at the automatic teller machine.

9. The method of claim 8 further comprising:
sending the image of the user with the image of the check to the mobile device.

10. An automatic teller machine comprising:
a bus system;
a communications unit connected to the bus system;
a memory connected to the bus system, wherein the memory includes a set of instructions;
and a processing unit connected to the bus system, wherein the processing unit executes the set of instructions to receive, from a user, a check at the automatic teller machine; scan the check to generate an image; transmit the image to a financial institution data processing system; receive a transaction result involving the check from the financial institution data processing system; and transmit, by the automatic teller machine, the image and the transaction result to a mobile device associated with the user.

11. A data processing system for processing a check, the data processing system comprising:
receiving means for receiving, from a user, a check at an automatic teller machine;
scanning means for scanning the check to generate an image;
transmitting means for transmitting the image to a financial institution data processing system;
receiving means for receiving a transaction result involving the check from the financial institution data processing system; and
transmitting means for transmitting, by the automatic teller machine, the image and the transaction result to a mobile device associated with the user.

12. The data processing system of claim 11 further comprising:
importing means for importing the image and the transaction result into an end-user financial program that is useable to manage finances for the user such that both (i) a current account balance for the user, which accounts for an amount indicated by the received check, and (ii) the image of the received check are accessible to the user using the end-user financial program.

13. The data processing system of claim 12, wherein the financial program is located on the mobile device.

14. The data processing system of claim 12, wherein the financial program is located on another data processing system other than the mobile device.

15. The data processing system of claim 14, further comprising means for transmitting the image and the financial information from the mobile device to the another data processing system.

16. The data processing system of claim 11 further comprising:
sending means for sending an alert for the transaction to a plurality of users associated with an account, the account being updated based upon the transaction result.

17. The data processing system of claim 16, wherein the alert includes an identification of the transaction.

18. The data processing system of claim 11 further comprising: capturing means for capturing an image of the user at the automatic teller machine.

19. The data processing system of claim 18 further comprising:
sending means for sending the image of the user with the image of the check to the mobile device.

20. A computer readable medium with instructions for processing a check tangibly encoded thereon, the instructions comprising:
first instructions for receiving, from a user, a check at an automatic teller machine;
second instructions for scanning the check to generate an image;
third instructions for transmitting the image to a financial institution data processing system;
fourth instructions for receiving a transaction result involving the check from the financial institution data processing system; and
fifth instructions for transmitting, by the automatic teller machine, the image and the transaction result to a mobile device associated with the user.

21. The computer readable medium of claim 20 further comprising:
sixth instructions for importing the image and the transaction result into an end-user financial program that is useable to manage finances for the user such that both (i) a current account balance for the user, which accounts for an amount indicated by the received check, and (ii) the image of the received check are accessible to the user using the end-user financial program.

22. The computer readable medium of claim 21, wherein the financial program is located on the mobile device.

23. The computer readable medium of claim 21, wherein the financial program is located on another data processing system other than the mobile device.

24. The computer readable medium of claim 20 further comprising:
sixth instructions for sending an alert for the transaction to a plurality of users associated with an account, the account being updated based upon the transaction result.

25. The computer readable medium of claim 24, wherein the alert includes an identification of the transaction.

26. The computer readable medium of claim 20 further comprising:
sixth instructions for capturing an image of the user at the automatic teller machine.

27. The computer readable medium of claim 26 further comprising:
seventh instructions for sending the image of the user with the image of the check to the mobile device.

* * * * *